US012328235B2

(12) United States Patent
Kuriyama et al.

(10) Patent No.: US 12,328,235 B2
(45) Date of Patent: Jun. 10, 2025

(54) INFORMATION PROCESSING DEVICE, INFORMATION PROCESSING METHOD, AND STORAGE MEDIUM

(71) Applicant: TOYOTA JIDOSHA KABUSHIKI KAISHA, Toyota (JP)

(72) Inventors: Kanade Kuriyama, Toyota (JP); Kaoru Yoshida, Nisshin (JP); Masataka Okuda, Toyota (JP); Hiroki Maki, Toyota (JP); Kosuke Watanabe, Toyota (JP); Masatoshi Kakutani, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 162 days.

(21) Appl. No.: 18/297,190

(22) Filed: Apr. 7, 2023

(65) Prior Publication Data

US 2024/0015078 A1    Jan. 11, 2024

(30) Foreign Application Priority Data

Jul. 7, 2022    (JP) ................. 2022-109547

(51) Int. Cl.
*H04L 41/147* (2022.01)
*H04L 45/121* (2022.01)
*H04W 4/40* (2018.01)

(52) U.S. Cl.
CPC .......... *H04L 41/147* (2013.01); *H04L 45/121* (2013.01); *H04W 4/40* (2018.02)

(58) Field of Classification Search
CPC ....... H04L 41/147; H04L 45/121; H04W 4/40
USPC ....................................... 709/238
See application file for complete search history.

(56) References Cited

U.S. PATENT DOCUMENTS

| | | | |
|---|---|---|---|
| 8,509,965 B2* | 8/2013 | Lin | G08G 5/0078 340/961 |
| 11,277,326 B2* | 3/2022 | Bannister | H04L 69/16 |
| 2007/0097951 A1* | 5/2007 | Hilt | H04L 45/04 370/351 |
| 2009/0231161 A1* | 9/2009 | Malarky | G08G 1/0175 340/10.41 |
| 2017/0155557 A1* | 6/2017 | Desai | H04L 41/145 |
| 2018/0131613 A1* | 5/2018 | Fraser | H04L 69/22 |
| 2020/0052974 A1* | 2/2020 | Yasuda | H04L 47/283 |
| 2020/0112514 A1* | 4/2020 | Fraser | H04L 47/225 |

(Continued)

FOREIGN PATENT DOCUMENTS

WO    WO 2018/168601 A1    9/2018

OTHER PUBLICATIONS

U.S. Appl. No. 17/821,901, filed Aug. 24, 2022, Yoshida et al.

*Primary Examiner* — Tauqir Hussain
(74) *Attorney, Agent, or Firm* — Oblon, McClelland, Maier & Neustadt, L.L.P.

(57) ABSTRACT

An information processing device that performs communication via a network includes: a storage unit that stores a receiving unit that receives data acquired by a device; the data; and past data received by the receiving unit before the data; a calculating unit that calculates a delay time in the network; a determination unit that determines, based on the calculated delay time, one or more past data used for prediction of future data that is not received by the receiving unit from the past data stored in the storage unit; and a predicting unit that predicts the future data using the determined past data.

10 Claims, 10 Drawing Sheets

(56) References Cited

U.S. PATENT DOCUMENTS

| | | | |
|---|---|---|---|
| 2021/0105659 A1* | 4/2021 | Li | H04L 47/283 |
| 2022/0103525 A1* | 3/2022 | Shribman | G06F 16/955 |
| 2023/0245238 A1* | 8/2023 | Sanchez | G01C 21/3492 |
| | | | 705/4 |
| 2023/0276210 A1* | 8/2023 | Cui | H04W 4/40 |
| | | | 701/300 |
| 2023/0333241 A1* | 10/2023 | Zhang | G01S 13/876 |

* cited by examiner

| DELAY TIME N(N1<N2) | NUMBER OF HISTORICAL DATA |
|---|---|
| N1 | 2 |
| N2 | 6 |

INFORMATION PROCESSING DEVICE, INFORMATION PROCESSING METHOD, AND STORAGE MEDIUM

CROSS-REFERENCE TO RELATED APPLICATION

This application claims priority to Japanese Patent Application No. 2022-109547 filed on Jul. 7, 2022, incorporated herein by reference in its entirety.

BACKGROUND

1. Technical Field

The present disclosure relates to an information processing device, an information processing method, and a storage medium.

2. Description of Related Art

Conventionally, a technique is known in which, in a system including a network in which a communication delay may occur, data of the future (hereinafter, referred to as "future data") is predicted based on data of the past (hereinafter, referred to as "past data"), and control of a target device is performed based on the predicted future data. For example, WO 2018/168601 describes that a delay prediction device predicts a future communication delay with a high accuracy based on past communication delay data, and that a target device is controlled in accordance with the prediction.

SUMMARY

However, in the technique described in WO 2018/168601, when a future communication delay used for controlling the target device is predicted with a high accuracy, there is a possibility that a processing load of the delay prediction device that predicts the future communication delay is increased. Such a problem is not limited to the prediction of the future communication delay, and may occur in the case of predicting any future data used for the control of the target device.

The present disclosure has been made in view of such a situation. An object of the present disclosure is to provide an information processing device, an information processing method, and a storage medium capable of achieving a balance between a processing load related to prediction of future data used for control of a target apparatus and a prediction accuracy of the future data.

An information processing device according to a first aspect of the present disclosure is an information processing device that performs communication via a network, the information processing device including:
  a receiving unit that receives data acquired by a device;
  a storage unit that stores the data and past data received by the receiving unit prior to the data;
  a calculating unit that calculates a delay time in the network;
  a determination unit that determines one or more pieces of past data to be used for predicting future data not received by the receiving unit, from the past data stored in the storage unit, based on the calculated delay time; and
  a predicting unit that predicts the future data by using the determined past data.

An information processing method according to a second aspect of the present disclosure is an information processing method by an information processing device that performs communication via a network, the information processing method including:
  a step of receiving data acquired by a device;
  a step of storing the data in a storage unit provided in the information processing device;
  a step of calculating a delay time in the network;
  a step of determining, based on the calculated delay time, one or more pieces of past data to be used for predicting future data that has not yet been received, from past data received prior to the data stored in the storage unit; and
  a step of predicting the future data by using the determined past data.

A storage medium that stores an information processing program according to a third aspect of the present disclosure causes an information processing device that performs communication via a network to execute the following processing, the following process including:
  a step of receiving data acquired by a device;
  a step of storing the data in a storage unit provided in the information processing device;
  a step of calculating a delay time in the network;
  a step of determining, based on the calculated delay time, one or more pieces of past data to be used for predicting future data that has not yet been received, from past data received prior to the data stored in the storage unit; and
  a step of predicting the future data by using the determined past data.

According to an aspect of the present disclosure, it is possible to achieve a balance between a processing load related to prediction of future data used for control of a target device and a prediction accuracy of the future data.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described with reference to the accompanying drawings. In the drawings, elements referred to by the same reference signs have the same or similar configurations.

Overview

Figure 1:
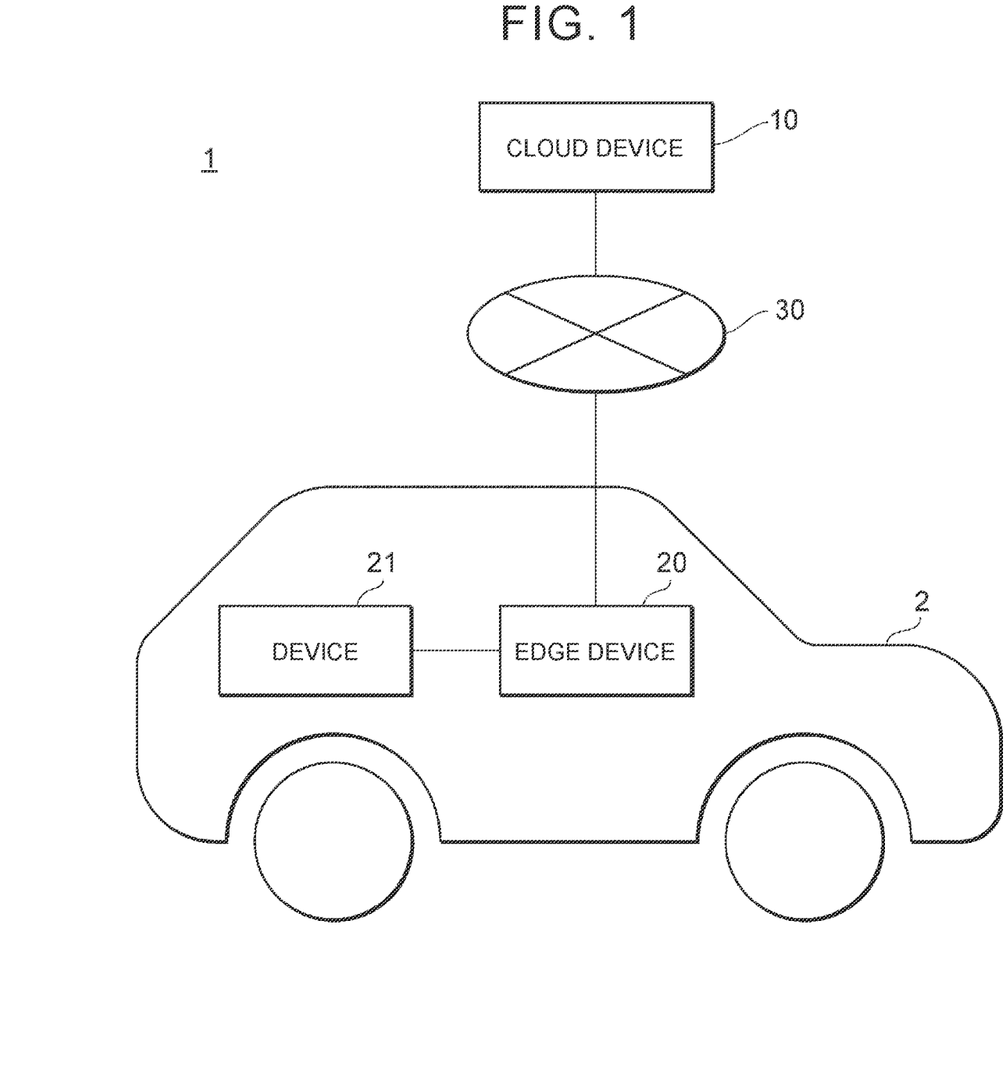
FIG. 1 is a diagram illustrating an example of an outline of an information processing system according to the present embodiment.

FIG. 1 is a diagram illustrating an example of an outline of an information processing system according to the present embodiment. For example, the information processing system 1 includes a cloud-side information processing device (hereinafter, referred to as "cloud device") 10 and an edge-side information processing device (hereinafter, referred to as "edge apparatus") 20.

The cloud device 10 includes one or a plurality of devices (for example, servers) on the cloud side. The cloud device 10 is connected to the edge device 20 via the network 30. The network 30 may be a wired and/or wireless network. The network 30 may be, for example, a network that supports Vehicle to Everything (V2X) communication, Vehicle to Infrastructure (V2I) communication, and/or Vehicle to Network (V2N) communication.

The edge device 20 includes one or a plurality of devices on the edge side. The edge device 20 is connected to one or more devices 21 provided on the edge side. For example, as shown in FIG. 1, the edge device 20 and the device 21 are mounted on the vehicle 2. The edge device 20 and the device 21 may be connected to each other via an in-vehicle network (for example, a Controller Area network (CAN). Note that FIG. 1 is merely an example. The edge device 20 and/or the device 21 may not be mounted on the vehicle 2. The edge device 20 and/or the device 21 may constitute an edge-side system. The number of devices 21 connected to the edge device 20 is not limited to one. A plurality of devices 21 may be connected to the edge device 20.

The device 21 may be, for example, at least one of a camera, a positioning device (for example, a Global Positioning System (GPS) receiver, and various sensors. The various sensors may include, for example, Light Detection And Ranging (LiDAR) or Laser Imaging Detection And Ranging (LiDAR), velocity sensors, ultrasonic sensors, accelerometers, and the like.

The edge device 20 transmits the data acquired by the device 21 to the cloud device 10 via the network 30. The data may be, for example, data related to the vehicle 2, such as information related to at least one of a position, a speed, an acceleration, and a captured image of the vehicle 2. The cloud device 10 may generate control information of the target device (for example, the vehicle 2) based on the data received from the edge device 20 via the network 30, and feed back the control information to the edge device 20. The control information may be, for example, control information related to Advanced Driver-Assistance Systems (ADAS).

Figure 2:
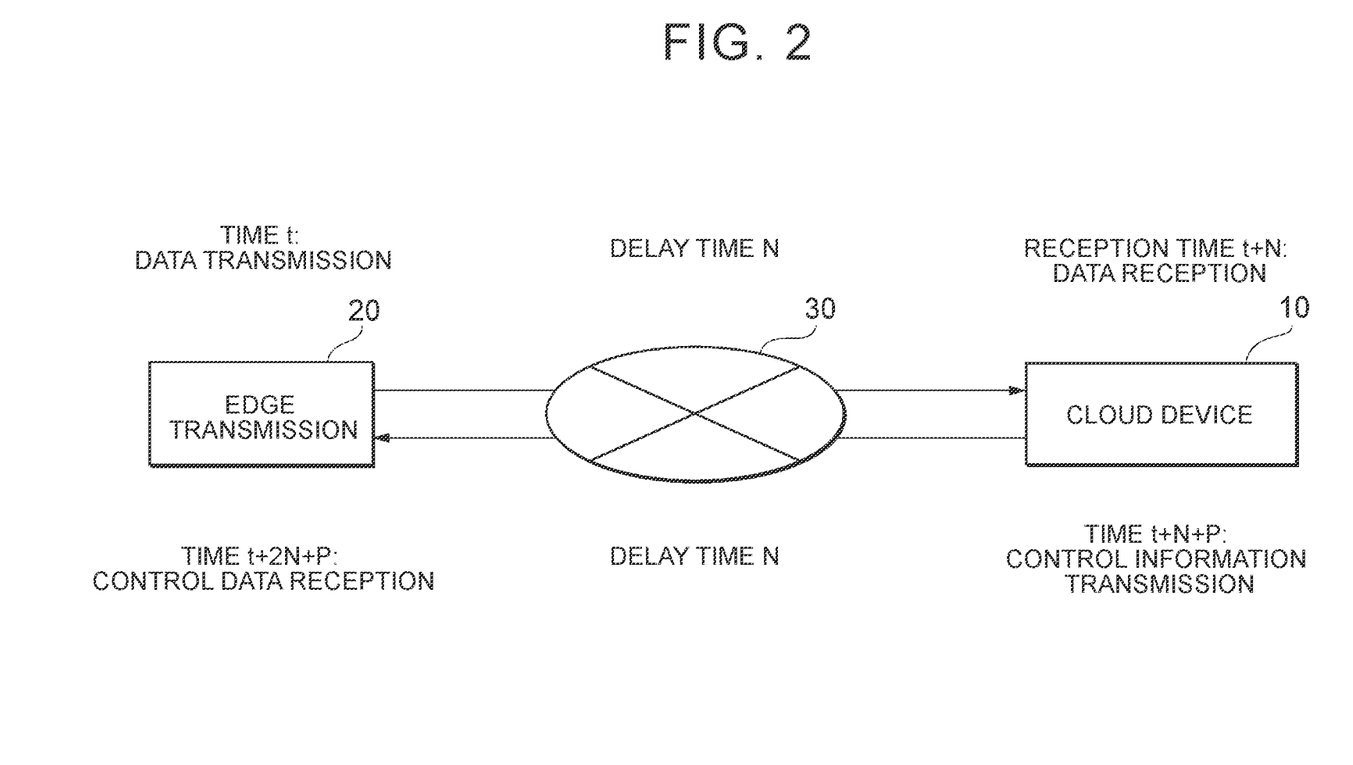
FIG. 2 is a diagram illustrating an example of a delay time in the information processing system according to the present embodiment.

In the information processing system 1 as described above, it is also assumed that a delay occurs in the network 30 connecting the cloud device 10 and the edge device 20. FIG. 2 is a diagram illustrating an example of a delay time in the information processing system according to the present embodiment. In FIG. 2, it is assumed that a device to be controlled by the cloud device 10 is an edge-side device (for example, the vehicle 2).

For example, in FIG. 2, at time t, data transmitted from the edge device 20 is received by the cloud device 10 at time t+N. The cloud device 10 processes the data at the processing time P to generate control information of the target device (for example, the vehicle 2). The cloud device 10 transmits the control information to the edge device 20 at time t+N+P. The control information is received by the edge device 20 at time t+2N+P after the delay time N in the network 30 has elapsed. As described above, after the edge device 20 transmits the data and before the edge device 20 receives the control information generated by the cloud device 10 based on the data, a round-trip delay time $2N(=2 \cdot N)$ and a processing time P in the cloud device 10 occur.

In FIG. 2, when the delay time N increases, the control information generated based on the data at the time t lacks real-time properties at the time t+2N+P received by the edge device 20, and there is a possibility that the control of the target device based on the control information cannot be appropriately performed. For this reason, it is conceivable to predict future data (for example, data transmitted from the edge device 20 at time t+2N+P) and generate control information of the target device based on the predicted future data, so that the target device is controlled without lacking real-time property even when the delay time N is large. On the other hand, when future data used for control of a target device is predicted with high accuracy, there is a possibility that a processing load related to prediction of the future data increases.

Figure 3:
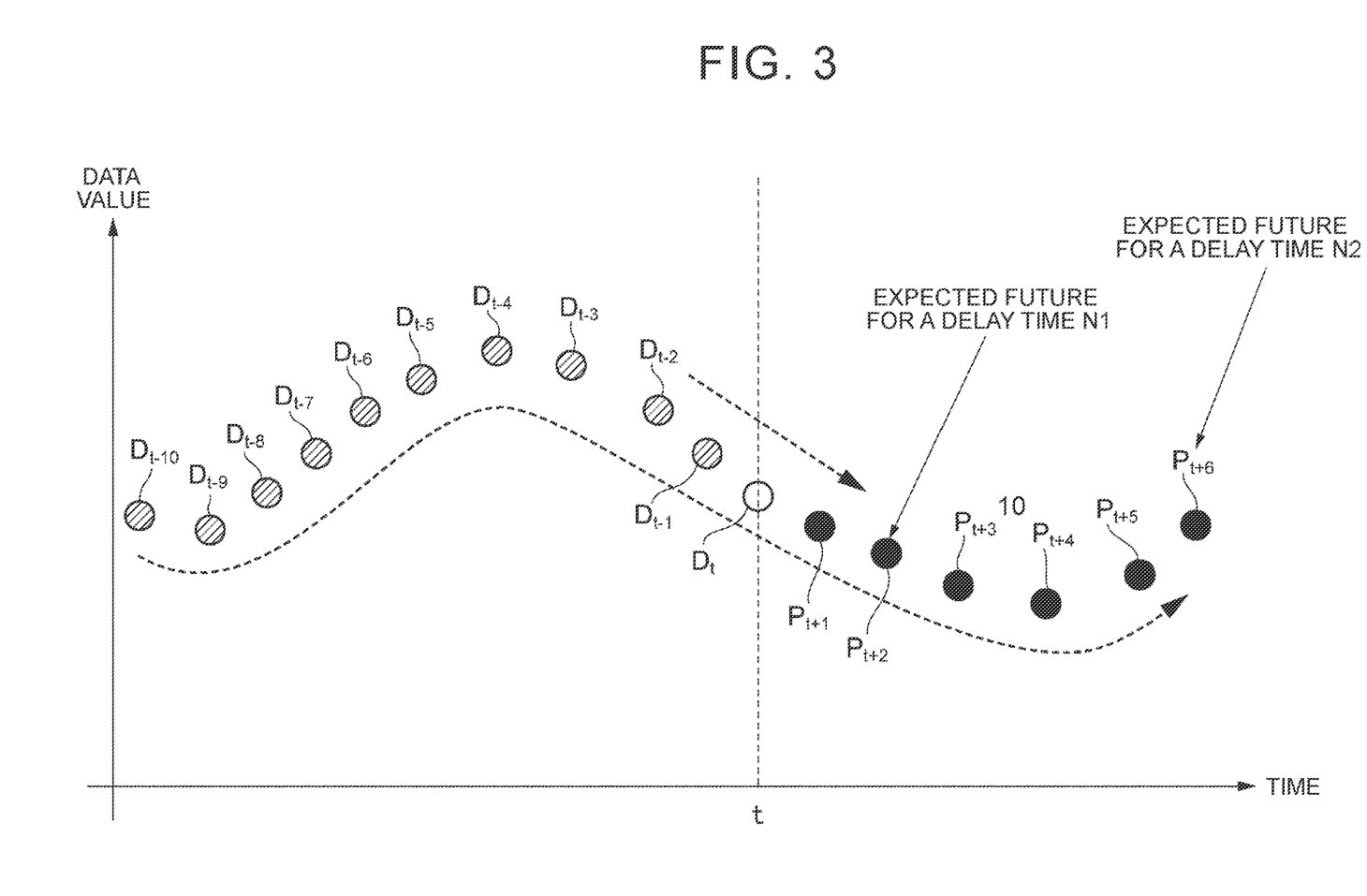
FIG. 3 is a diagram illustrating an example of future data and past data according to the present embodiment.

FIG. 3 is a diagram illustrating an example of a change in data transmitted from the edge device 20 according to the present embodiment. In FIG. 3, a change in data acquired at the device 21 is shown. For example, FIG. 3 shows data $D_t$ of time t, past data $D_{t-10}$ to $D_{t-1}$, which are data t−1 from time t−10 prior to time t, and future data $P_{t+1}$ to $P_{t+6}$, which are data from time t+1 to t+6 after time t, based on time t. Note that t+6 from the time t−10 is the transmission time or the scheduled transmission time of the data by the edge device 20 or the device 21, respectively.

In FIG. 3, assuming that the delay time N1 is smaller than the delay time N2, the future data $P_{t+2}$, which is to be predicted in the case of the delay time N1, becomes closer to the time t than the future data $P_{t+6}$, which is to be predicted in the case of the delay time N1, in order to control the target device without the lack of real-time property. In addition, it is assumed that the past data required for the prediction of the future data $P_{t+2}$ is smaller than the past data required for the prediction of the future data $P_{t+6}$. For example, in order to maintain the appropriate prediction accuracy, the prediction of the future data $P_{t+2}$ may refer to the past data $D_{t-2}$ to $D_{t-1}$, whereas the prediction of the future data $P_{t+6}$ requires the reference of the past data $D_{t-2}$ to $D_{t-6}$. Conversely, the use of the previous data $D_{t-2}$ to $D_{t-6}$ for the prediction of the future data $P_{t+2}$ may unnecessarily increase the processing loads related to the prediction.

As described above, when the delay time N is large, it is necessary to predict future data farther from the time t, and therefore, in order to maintain the prediction accuracy, it is necessary to use a large amount of past data for the prediction of the future data. On the other hand, when the delay time N is small, it is only necessary to predict the data in the near future by the time t, and thus it is possible to maintain the prediction accuracy even if there is less past data used for the prediction of the future data. Therefore, in the information processing system 1 according to the present embodiment, by determining one or a plurality of past data to be used for prediction of future data based on the delay time N in the network 30, a balance between a processing load related to prediction of future data to be used for control of a target device and prediction accuracy of future data is achieved.

Hereinafter, the configuration and operation of the information processing system 1 according to the present embodiment will be described with reference to a case (first embodiment) in which the cloud device 10 is used as a subject for predicting future data by determining past data to be used for prediction of future data based on the delay time N, and a case (second embodiment) in which the edge device 20 is used.

In the following description, it is assumed that a control target device based on future data is the vehicle 2. However, a device to be controlled based on future data is not limited to this. The target device may be any device on the edge side.

First Embodiment

Figure 4:
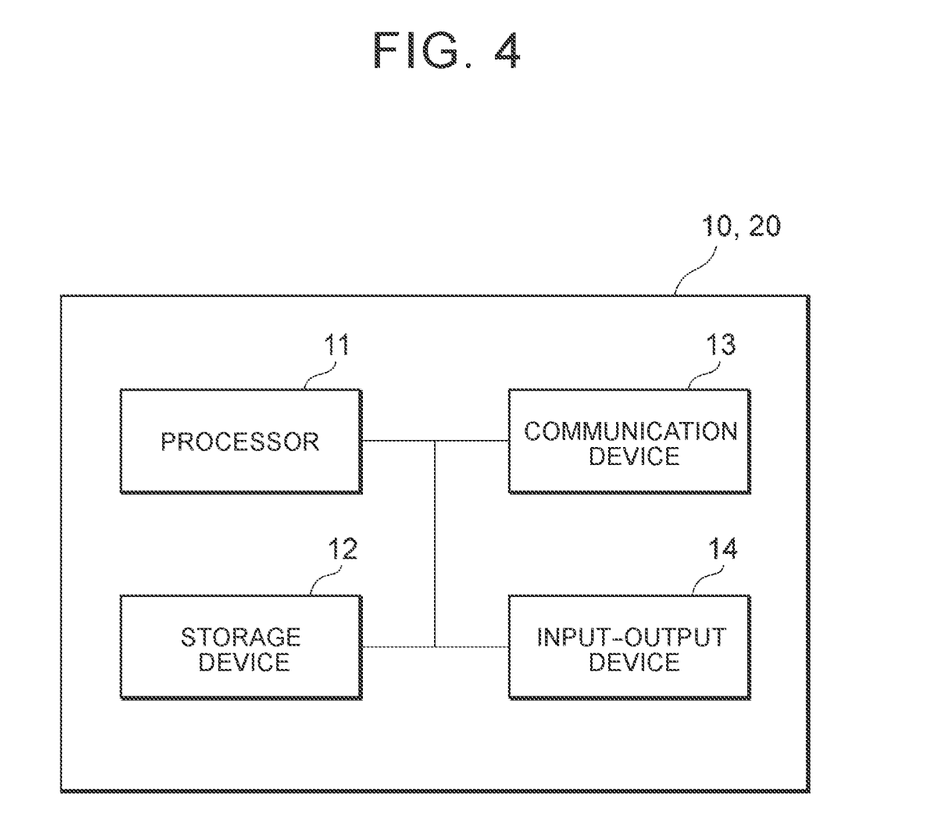
FIG. 4 is a diagram illustrating an example of a physical configuration of each device of the information processing system according to the first embodiment.

Configuration
The physical configuration and the functional configuration of the information processing system 1 according to the first embodiment will be described.
Physical Configuration
FIG. 4 is a diagram illustrating an example of a physical configuration of each device of the information processing system according to the first embodiment. Each device (for example, the cloud device 10 and the edge device 20) in the information processing system 1 includes a processor 11, a storage device 12, a communication device 13 that performs wired or wireless communication, an input device that receives various input operations, and an input/output device 14 that outputs various kinds of information. The processor 11 executes a program stored in the storage device 12, thereby realizing at least a part of the functions of the control unit of each device.

The processor 11 is, for example, a Central Processing Unit (CPU, and controls the respective apparatuses in the information processing system 1. The processor 11 may execute various processes described in the present embodiment by reading and executing a program from the storage device 12. Each device in the information processing system 1 may be configured by one or a plurality of processors 11. Each of the apparatuses may be referred to as a computer.

The storage device 12 is composed of storage (storage medium) such as, for example, memory, Hard Disk Drive (HDD) and/or Solid State Drive (SSD). The storage device 12 may store various kinds of information (for example, a program executed by the processor 11) necessary for execution of processing by the processor 11. The storage device 12 realizes at least a part of the functions of the storage units of the respective devices.

The communication device 13 is a device that performs communication via a network. The communication device 13 may include, for example, a network card, a communication module, a chip, an antenna, and the like. The input/output device 14 includes, for example, an input device such as a keyboard, a touch panel, a mouse and/or a microphone, and an output device such as a display and/or a speaker. The communication device 13 realizes at least a part of the functions of the transmitting unit, the receiving unit, or the transmitting/receiving unit of each device.

The physical configuration described above is merely an example. Part of the hardware illustrated in FIG. 3 may be omitted for each device in the information processing system 1. Each device in the information processing system 1 may include hardware that is not illustrated in FIG. 3. In addition, the hardware illustrated in FIG. 3 may be configured by one or a plurality of chips.

Figure 5:
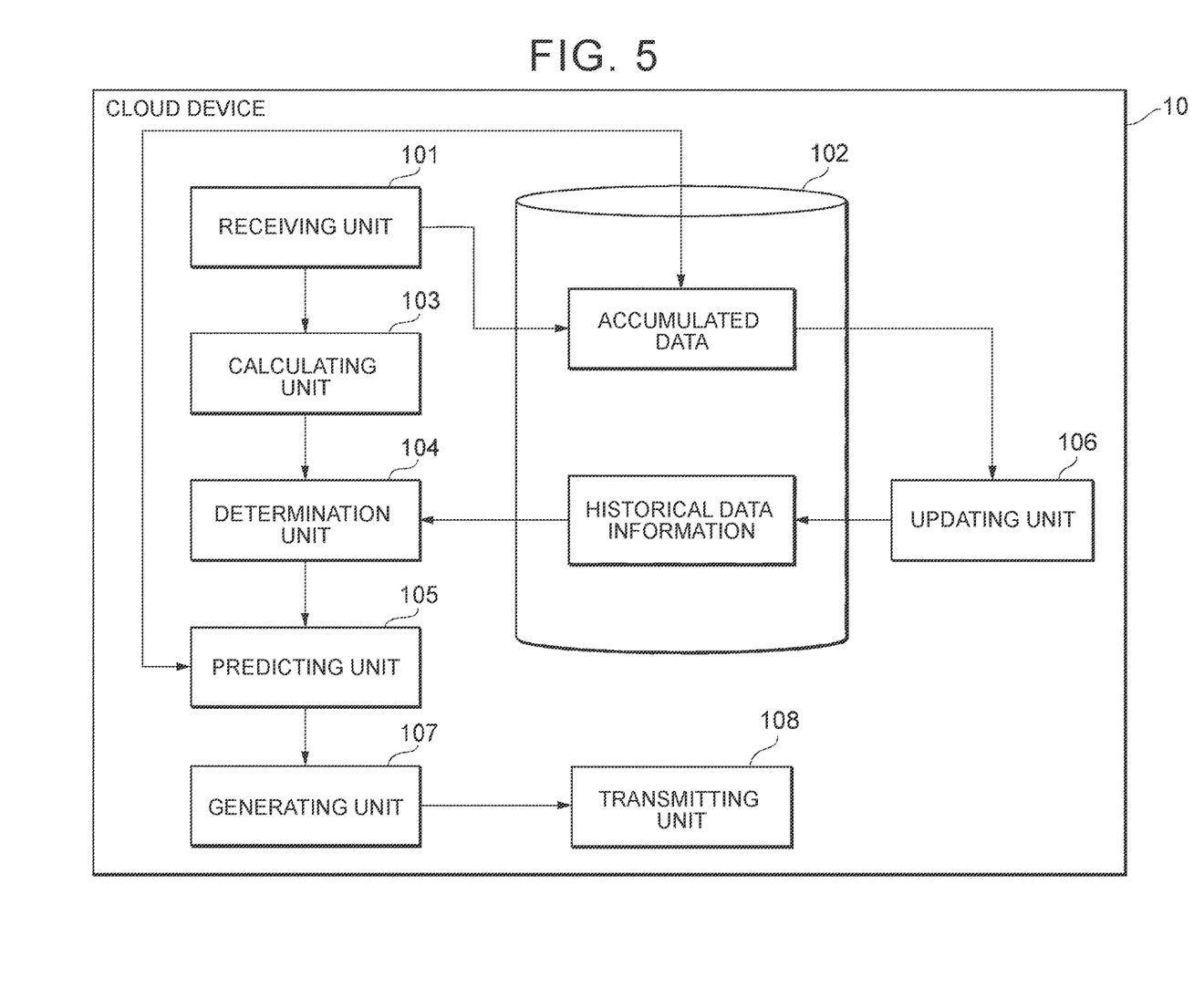
FIG. 5 is a diagram illustrating an example of a functional configuration of the cloud device 10 according to the first embodiment.

Functional Configuration
FIG. 5 is a diagram illustrating an example of a functional configuration of the cloud device 10 according to the first embodiment. As illustrated in FIG. 5, the cloud device 10 includes a receiving unit 101, a storage unit 102, a calculating unit 103, a determination unit 104, a predicting unit 105, an updating unit 106, a generating unit 107, and a transmitting unit 108. Note that the calculating unit 103, the determination unit 104, the predicting unit 105, the updating unit 106, and the generating unit 107 may be collectively referred to as a control unit. FIG. 5 is only an example. The cloud device 10 may not include all of the functional configurations illustrated in FIG. 5. The cloud device 10 may have a configuration (not shown).

The receiving unit 101 receives data via the network 30. Specifically, the receiving unit 101 may receive, from the edge device 20, information indicating the transmission time of the data (hereinafter, referred to as "transmission time information") together with the data. The transmission time may be a time at which the device 21 transmits the data acquired by the device 21 to the edge device 20. Alternatively, the transmission time may be a time at which the edge device 20 transmits the data acquired from the device 21 to the cloud device 10.

The storage unit 102 stores the data received by the receiving unit 101 and the past data received by the receiving unit 101 via the network 30 before the data as accumulated data. Further, the storage unit 102 may store future data predicted by the predicting unit 105, which will be described later, as accumulated data.

Figure 6:
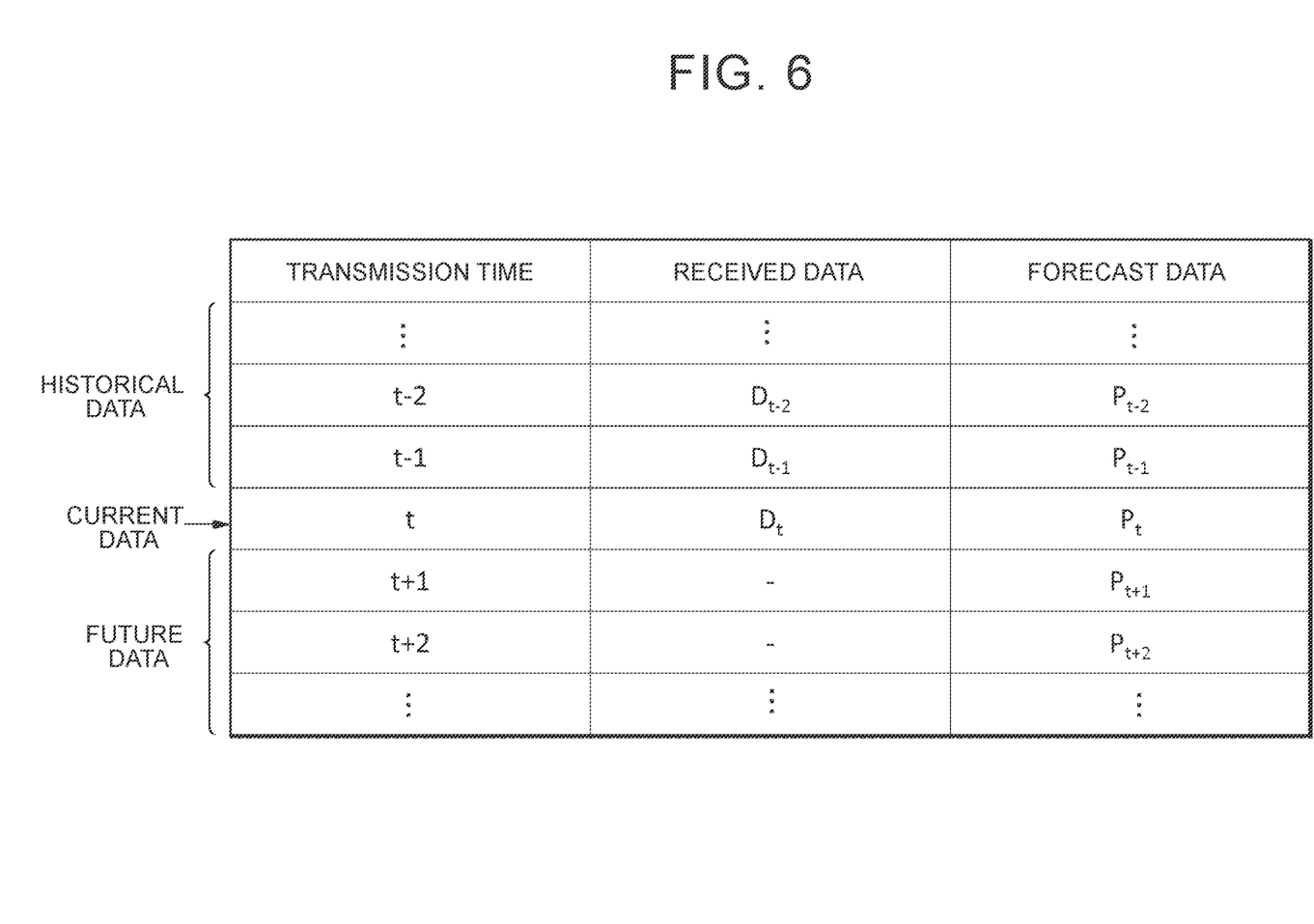
FIG. 6 is a diagram illustrating an example of stored data of the storage unit 102 according to the first embodiment.

FIG. 6 is a diagram illustrating an example of accumulated data in the storage unit 102 according to the first embodiment. In the accumulated data, the data received by the receiving unit 101 (also referred to as "received data") and the transmission time of the received data are at least associated with each other. In addition, in the accumulated data, future data (also referred to as "prediction data") predicted by the predicting unit 105 described later and reception data corresponding to the future data may be associated with each other.

For example, when the data $D_t$ received most recently by the receiving unit 101 is the present (current) data, the data $D_{t-1}$, $D_{t-2}$, received by the receiving unit 101 prior to the data $D_t$ are the historical data. Further, the data $P_{t+1}$, $P_{t+2}$, predicted by the predicting unit 105 may be associated with the times t+1, t+2, after the time t as future data.

Further, the storage unit 102 stores information (hereinafter, "past data information") used for determination of past data by the determination unit 104, which will be described later. The past data information may be, for example, information associating the delay time N with at least one of the number, the amount, and the time range of the past data corresponding to the delay time N.

Figure 7:
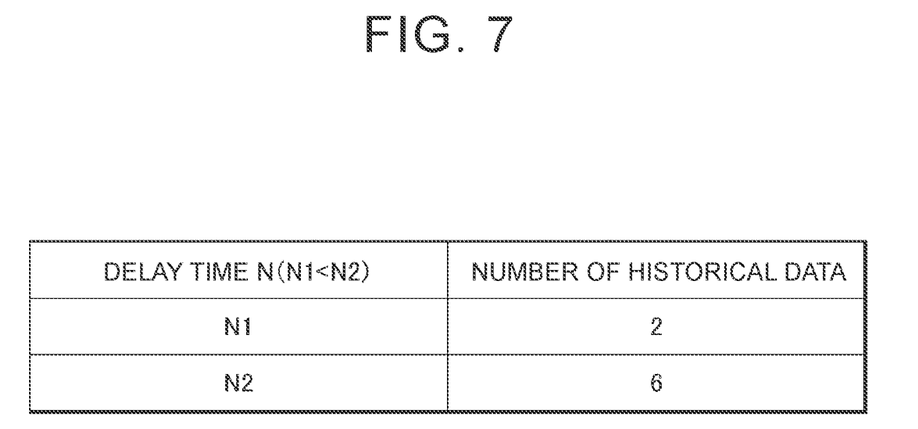
FIG. 7 is a diagram illustrating an example of past data information of the storage unit 102 according to the first embodiment.

FIG. 7 is a diagram illustrating an example of past data information in the storage unit 102 according to the first embodiment. For example, in the past data information illustrated in FIG. 7, the delay time N and the number of past data corresponding to the delay time N are associated with each other. FIG. 7 is an example only. Of course, at least one of the delay time N and the amount and time range corresponding to the delay time N may be associated with each other.

The calculating unit 103 calculates a delay time N in the network 30. Specifically, the calculating unit 103 may calculate the delay time N based on the transmission time indicated by the transmission time information and the reception time of the current data by the receiving unit 101. For example, the calculating unit 103 may calculate the delay time N based on the difference between the transmission time and the reception time.

The determination unit 104 determines, based on the delay time N calculated by the calculating unit 103, one or a plurality of pieces of past data to be used for prediction of future data following the current data from the past data stored in the storage unit 102. Further, the determination unit 104 may determine less past data to be used for prediction of future data as the delay time N is smaller. For example, as illustrated in FIG. 3, the determination unit 104 determines less past data corresponding to the delay time N1 than the past data corresponding to the delay time N2 based on the delay time N1 smaller than the delay time N2.

Specifically, the determination unit 104 determines at least one of the number, the amount, and the time range of the past data based on the delay time N. For example, the determination unit 104 determines at least one of the number, the amount, and the time range of the past data based on the past data information stored in the storage unit 102. The determination unit 104 may determine past data corresponding to at least one of the determined number, amount, and time range as past data used for prediction of future data.

Note that the determination unit 104 may determine one or a plurality of past data to be used for prediction of future data by using a model (not shown) based on machine learning stored in the storage unit 102. The model may be a model in which machine learning is performed using past data information that associates the delay time N with at least one of the number, the amount, and the time range of past data corresponding to the delay time N as learning data. For example, the determination unit 104 may input the delay time N calculated by the calculating unit 103 to the model, determine at least one of the number, the amount, and the time range of the past data corresponding to the delay time N from the output result of the model, and determine at least one of the determined number, the amount, and the time range.

The predicting unit 105 predicts future data using the past data determined by the determination unit 104. Specifically, the predicting unit 105 may extract the past data determined by the determination unit 104 from the storage unit 102 and calculate a prediction formula (for example, an approximate formula) based on the extracted past data. The predicting unit 105 may generate future data using the calculated prediction formula. For example, in the case illustrated in FIG. 3, when the determination unit 104 determines that the number of past data required for prediction of the future data $P_{t+2}$, is 2, the predicting unit 105 may predict the future data $P_{t+2}$, using the past data $D_{t-1}$ and $D_{t-2}$.

The predicting unit 105 may store the predicted future data in the storage unit 102. Specifically, the predicting unit 105 may store the predicted future data in the storage unit 102 in association with the scheduled transmission time of the future data. For example, as illustrated in FIG. 6, the predicting unit 105 may associate the predicted future data $P_{t+2}$ with the scheduled transmission time t+2 and store the data in the storage unit 102.

Note that the prediction of future data in the predicting unit 105 is not limited to the prediction using the above-described approximate expression. For example, a model (not shown) based on machine learning stored in the storage unit 102 may be used. The model may be machine-learned using past data and future data predicted by the past data or actual data (received data) corresponding to the future data as learning data.

The updating unit 106 may update the past data information (for example, FIG. 7) stored in the storage unit 102 based on the comparison result between the future data predicted by the predicting unit 105 and the data corresponding to the future data.

For example, the updating unit 106 may update the past data information stored in the storage unit 102 based on the comparison result between the data $D_t$ at the time t received by the receiving unit 101 and the future data $P_t$ at the time t predicted by the predicting unit 105. For example, the updating unit 106 may update at least one of the number, the amount, and the time range of the past data associated with the delay time N based on the difference between the current data $D_t$ and the future data $P_t$.

The generating unit 107 may generate control information related to the vehicle 2 based on the future data predicted by the predicting unit 105. The transmitting unit 108 may transmit the control information generated by the generating unit 107 to the edge device 20.

Operation

Figure 8:
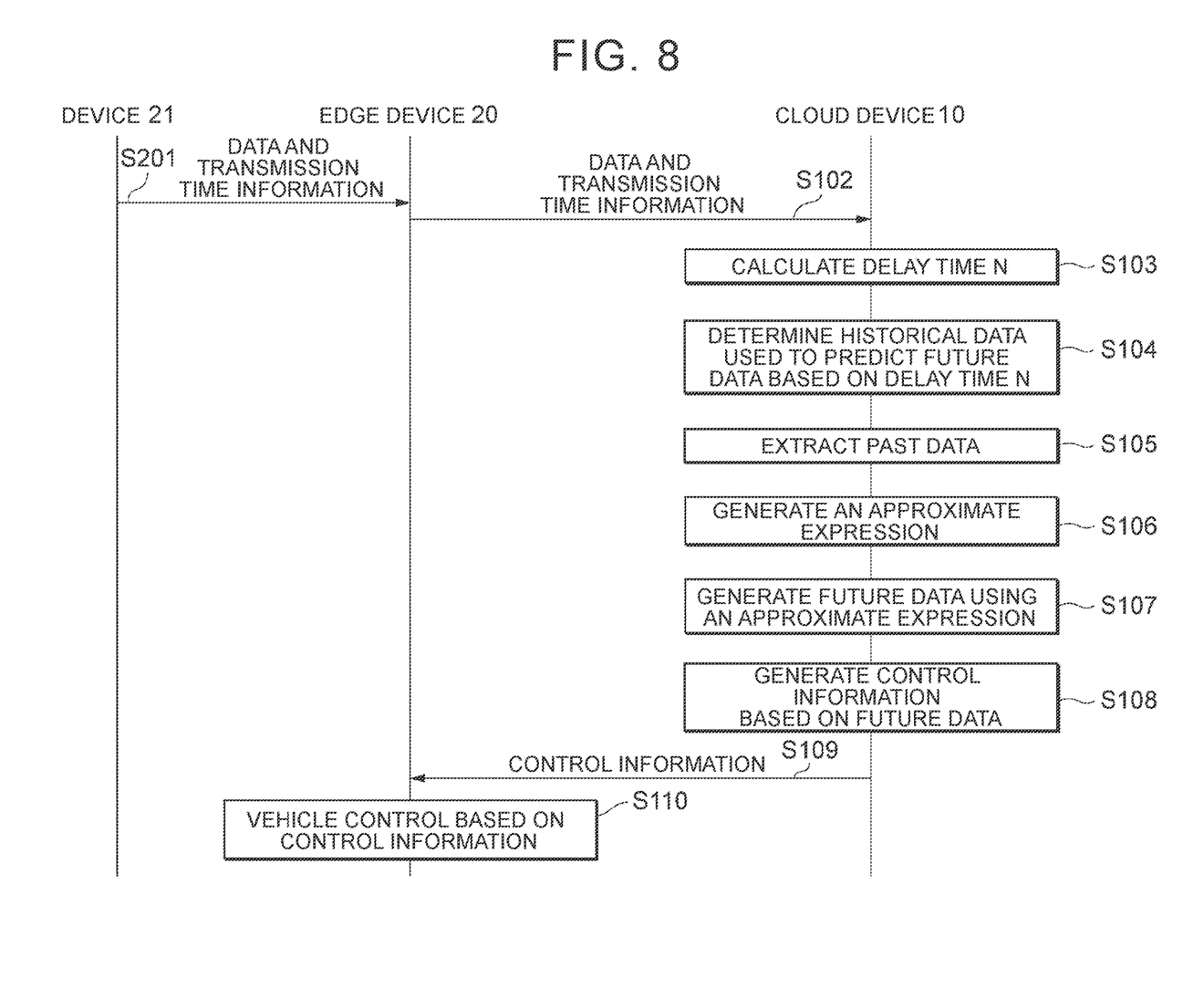
FIG. 8 is a sequence diagram illustrating an example of operations of the cloud device 10 and the edge device 20 according to the first embodiment.

FIG. 8 is a sequence diagram illustrating an example of operations of the cloud device 10 and the edge device 20 according to the first embodiment. Note that FIG. 8 is merely an example. The order of at least two steps may be changed, or steps (not shown) may be added. Note that the operation illustrated in FIG. 8 may be repeated at a predetermined cycle. Alternatively, the operation illustrated in FIG. 8 may be performed every time data is transmitted from the device 21.

As illustrated in FIG. 8, in the step S101, the edge device 20 acquires data and transmission time information indicating a transmission time of the data from the device 21. Here, it is assumed that the transmission time is a transmission time of data from the device 21. However, the transmission time is not limited to this. The transmission time may be a transmission time from the device 21. When the transmission time from the device 21 is used, the edge device 20 may not receive the transmission time information from the device 21.

In step S102, the edge device 20 transmits the data acquired from the device 21 and the transmission time information to the cloud device 10. The cloud device 10 receives the data and the transmission time information via the network 30. For example, as illustrated in FIG. 6, the cloud device 10 may store the received data in the storage unit 102 in association with the transmission time indicated by the transmission time information.

In step S103, the cloud device 10 calculates the delay time N in the network 30 based on the reception time of the data in step S102 and the transmission time indicated by the transmission time information.

In step S104, the cloud device 10 determines one or more pieces of historical data to be used for predicting future data following the data received in step S101 from the historical data stored in the storage unit 102, based on the delay time N calculated in step S103. Specifically, the cloud device 10 may determine at least one of the number, the amount, and the time range of the past data corresponding to the delay time N with reference to the past data information (for example, FIG. 7) stored in the storage unit 102, and extract at least one of the determined number, the amount, and the time range from the storage unit 102.

For example, when the cloud device 10 receives the data $D_t$ shown in FIG. 3 in the step S101, calculates the delay time "N1" in the step S103, and determines the past data used for the prediction of the future data $P_{t+2}$, the number of the past data corresponding to the delay time "N1" may be determined to be "2" with reference to the past data information shown in FIG. 7, and the two past data $D_{t-1}$ and $D_{t-2}$ received prior to the data $D_t$ may be determined as the past data used for the prediction of the future data $P_{t+2}$.

In step S105, the cloud device 10 extracts the historical data determined in step S104 from the storage unit 102. In step S106, the cloud device 10 calculates an approximate expression based on the historical data extracted in step S105. In the step-wise S107, the cloud device 10 predicts future data using the calculated approximate expression. For example, the cloud device 10 may generate the future data $P_{t+2}$ illustrated in FIG. 3 using the approximate expression calculated based on the past data $D_{t-1}$ and $D_{t-2}$ determined in the step S105.

In the step S108, the cloud device 10 generates the control data of the vehicles 2 based on the future data predicted in the step S107. In S109 of steps, the cloud device 10 transmits the generated control data to the edge device 20. In the step-wise S110, the edge device 20 controls the vehicles 2 based on the control data from the cloud device 10.

According to the operation illustrated in FIG. 8, when the future data $P_{t+2}$ illustrated in FIG. 3 is predicted, the cloud device 10 determines the past data $D_{t-1}$ and $D_{t-2}$ to be used for the prediction of the future data $P_{t+2}$ based on the delay time N. Therefore, when the delay time N is small, it is possible to suppress the processing load related to prediction from increasing by predicting the future data with reference to many past data, and it is possible to balance the processing load related to prediction with the prediction accuracy.

Further, the cloud device 10 does not generate the control information of the vehicle 2 from the data $D_t$, which is acquired by the device 21, but generates the control information of the vehicle 2 from the future data $P_{t+2}$, which is given consideration for the delay time N in the network 30. Therefore, even when the delay time N in the network 30 is large, the real-time property of the control information of the vehicle 2 can be ensured, and the vehicle 2 as the target device can be appropriately controlled.

As described above, according to the information processing system 1 of the first embodiment, since the cloud device 10 determines one or a plurality of past data used for prediction of future data used for control of the target device (for example, the vehicle 2) based on the delay time N in the network 30, it is possible to balance the processing load related to the prediction of the future data with the prediction accuracy of the future data.

Second Embodiment

Next, the second embodiment will be described with a focus on differences from the first embodiment. The second embodiment is different from the first embodiment in that the edge device 20 predicts future data instead of the cloud device 10.
Configuration
The physical configuration of each device constituting the information processing system 1 according to the second embodiment is the same as the physical configuration of each device constituting the information processing system 1 according to the first embodiment described with reference to FIG. 4.

Figure 9:
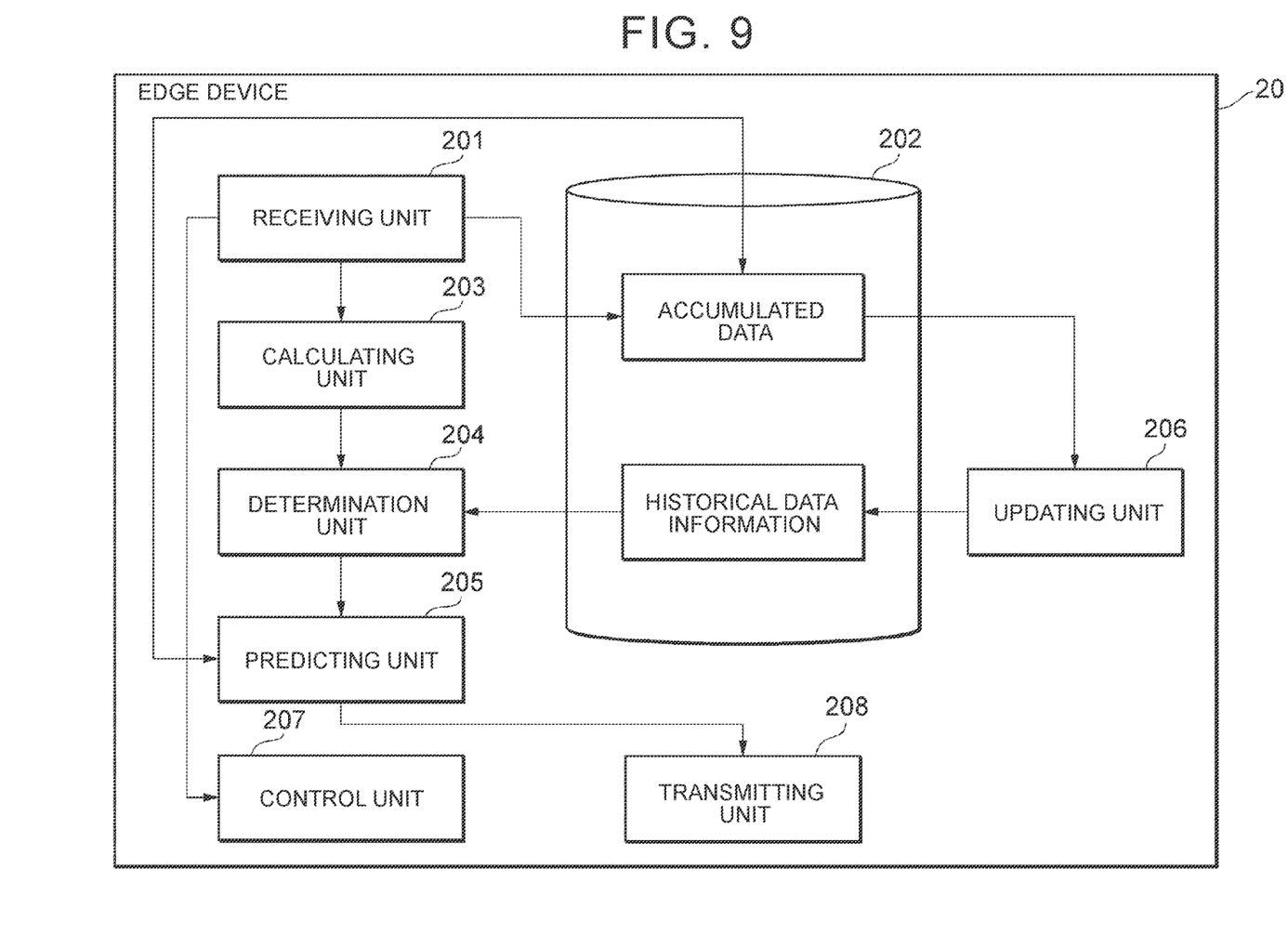
FIG. 9 is a diagram illustrating an exemplary functional configuration of the edge device 20 according to the second embodiment.

FIG. 9 is a diagram illustrating an example of a functional configuration of the edge device 20 according to the second embodiment. The functional configuration of the edge device 20 illustrated in FIG. 9 will be mainly described with respect to differences from the functional configuration of the cloud device 10 illustrated in FIG. 5. As illustrated in FIG. 9, the edge device 20 includes a receiving unit 201, a storage unit 202, a calculating unit 203, a determination unit 204, a predicting unit 205, an updating unit 206, a control unit 207, and a transmitting unit 208. Note that the calculating unit 203, the determination unit 204, the predicting unit 205, the updating unit 206, and the control unit 207 may be collectively referred to as a control unit. Moreover, FIG. 9 is merely an example. The edge device 20 may not include all of the functional configurations illustrated in FIG. 9. The edge device 20 may have a configuration (not shown).

The receiving unit 201 receives data from the device 21. In addition, the receiving unit 201 may receive, from the device 21, transmission time information indicating a transmission time of data from the device 21 together with the data. The delay time on the edge side between the device 21 and the edge device 20 may be calculated based on the transmission time and the reception time at which the receiving unit 201 receives the transmission time information.

Further, the receiving unit 201 may receive information indicating the time (hereinafter, referred to as "cloud time information") from the cloud device 10. The time indicated by the cloud time information may be a time at which the cloud time information is transmitted by the cloud device 10. The delay time N in the network 30 between the edge device 20 and the cloud device 10 may be calculated based on the transmission time indicated by the cloud time information and the reception time at which the receiving unit 201 receives the cloud time information. Further, the receiving unit 201 may receive the control information of the vehicle 2 generated by the cloud device 10.

Similarly to the storage unit 102, the storage unit 202 stores the data received by the receiving unit 201 and the past data received by the receiving unit 201 before the data as accumulated data (for example, FIG. 6). Further, the storage unit 202 may store the future data predicted by the predicting unit 205, which will be described later, as accumulated data (for example, FIG. 6). Further, the storage unit 202 may store past data information (for example, FIG. 7).

The calculating unit 203 calculates a delay time N in the network 30. Specifically, the calculating unit 203 may calculate the delay time N in the network 30 between the edge device 20 and the cloud device 10 based on the transmission time indicated by the cloud time information and the reception time of the cloud time information by the receiving unit 201.

The determination unit 204, the predicting unit 205, and the updating unit 206 are the same as the determination unit 104, the predicting unit 105, and the updating unit 106, respectively. Note that, when the description of the determination unit 104, the predicting unit 105, and the updating unit 106 is replaced with the determination unit 204, the predicting unit 205, and the updating unit 206, the receiving unit 101, the storage unit 102, the calculating unit 103, the determination unit 104, and the predicting unit 105 are read as the receiving unit 201, the storage unit 202, the calculating unit 203, the determination unit 204, and the predicting unit 205, respectively.

The control unit 207 performs various controls related to the edge device 20. For example, the control unit 207 may control the operation of the vehicle 2 based on the control information of the vehicle 2 received by the receiving unit 201.

The transmitting unit 208 transmits various types of information to the cloud device 10. Specifically, the transmitting unit 208 may transmit the data acquired by the device 21 and/or the future data predicted by the predicting unit 205 to the cloud device 10.

Operation

Figure 10:
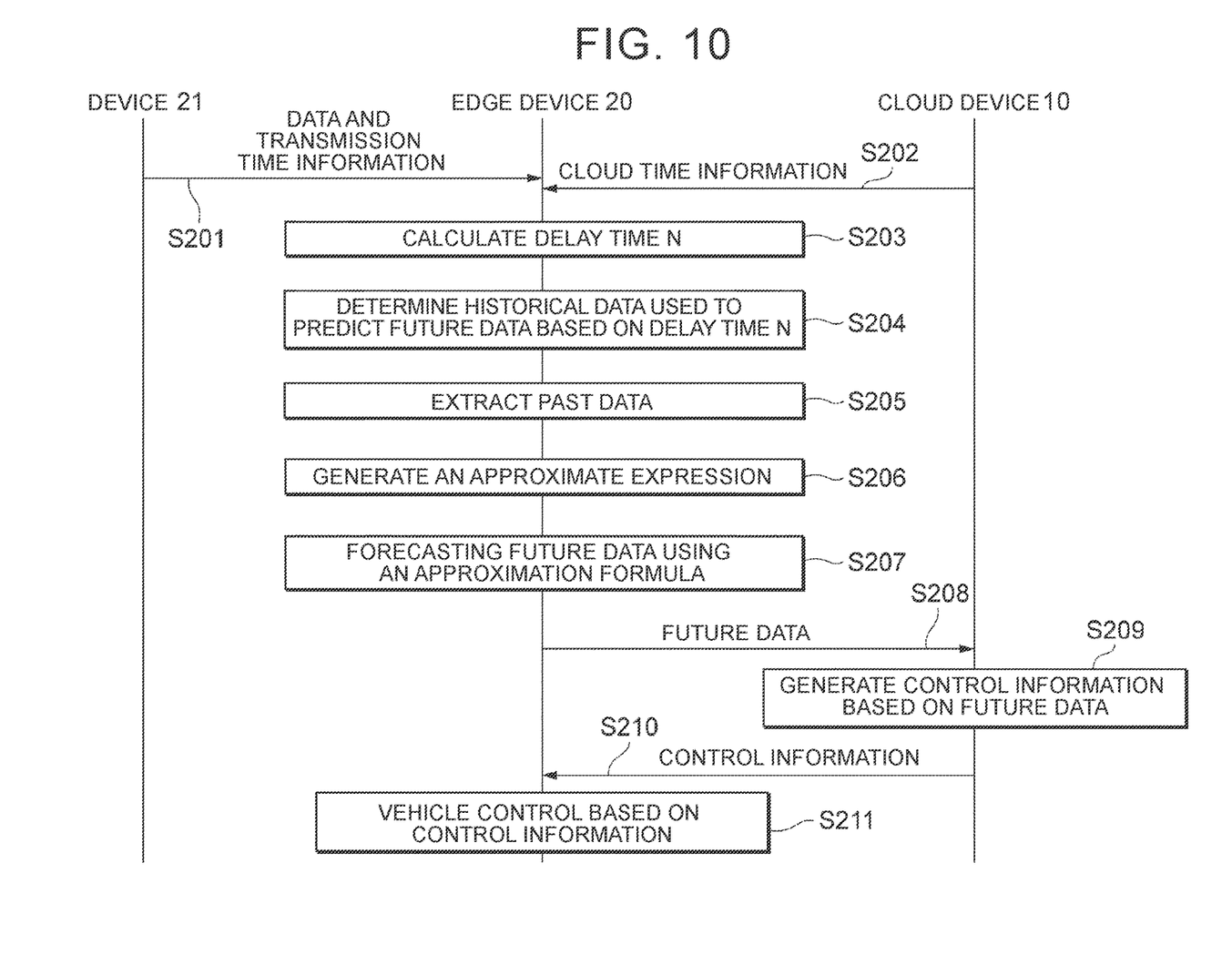
FIG. 10 is a sequence diagram illustrating an example of operations of the cloud device 10 and the edge device 20 according to the second embodiment.

FIG. 10 is a sequence diagram illustrating an example of operations of the cloud device 10 and the edge device 20 according to the second embodiment. Hereinafter, FIG. 10 will be described with a focus on differences from the operation shown in FIG. 8. The step S201 of FIG. 10 is similar to the step S101 of FIG. 8.

As illustrated in FIG. 10, in the step S202, the edge device 20 receives cloud time data from the cloud device 10. In the step S203, the edge device 20 may calculate the delay time N in the network 30 between the cloud device 10 and the edge device 20 on the basis of the transmitting time indicated by the cloud time information and the reception item of the cloud time information in the step S202.

In S207 from the step S204, the edge device 20 performs the operation of the cloud device 10 in S107 from the step S104 in FIG. 8. In the step S208, the edge device 20 transmits the predicted future data in the step S207 to the cloud device 10. In the step-wise S209, the cloud device 10 generates the control data of the vehicle 2 based on the future data received from the edge device 20. In step S210, the cloud device 10 transmits the control data of the vehicles 2 generated in step S209 to the edge device 20. The step S211 is similar to the step S110 of FIG. 8.

According to the operation illustrated in FIG. 10, when the future data $P_{t+2}$ illustrated in FIG. 3 is predicted, the edge device 20 determines the past data $D_{t-1}$ and $D_{t-2}$ used for the prediction of the future data $P_{t+2}$ based on the delay time N. Therefore, when the delay time N is small, it is possible to suppress the processing load related to prediction from increasing by predicting the future data with reference to many past data, and it is possible to balance the processing load related to prediction with the prediction accuracy.

Further, the cloud device 10 does not generate the control information of the vehicle 2 from the data $D_t$, which is acquired by the device 21, but generates the control information of the vehicle 2 from the future data $P_{t+2}$, which is given consideration for the delay time N in the network 30. Therefore, even when the delay time N in the network 30 is large, the real-time property of the control information of the vehicle 2 can be ensured, and the vehicle 2 as the target device can be appropriately controlled.

As described above, according to the information processing system 1 of the second embodiment, since the edge device 20 determines one or a plurality of past data used for prediction of future data used for control of the target device (for example, the vehicle 2) based on the delay time N in the network 30, it is possible to balance the processing load related to the prediction of the future data with the prediction accuracy of the future data.

Other

The embodiments described above are intended to facilitate understanding of the present disclosure. The embodiments described above are not intended to limit the present disclosure. Each element included in the embodiment and its arrangement, material, condition, shape, size, and the like are not limited to those exemplified, and can be appropriately changed. Some component members described in different embodiments may be replaced or combined with each other.

In the above embodiment, it is assumed that the control target device based on the future data is the vehicle 2. However, the present disclosure is not limited thereto. Any edge-side device (e.g., an IoT device) or the like may be the target device. Further, the edge device 20 may not be mounted on the vehicle 2. The edge device 20 may be an edge server or the like connected to one or more devices 21 via an edge-side network. Further, the transmission time or the scheduled transmission time of the data may be referred to as the acquisition time or the scheduled acquisition time of the data by the device 21.

What is claimed is:

1. An information processing device that performs communication via a network, the information processing device comprising:
   a network interface that receives data related to a position of a vehicle acquired by a device via the network;
   a memory that stores the data and past data related to a past position of a vehicle received by network interface prior to the data; and
   processing circuitry configured to
      calculate a delay time in the network by comparing a transmission time and a reception time of the data received by the network interface;
      determine, based on the calculated delay time, one or more pieces of the past data to be used for predicting future data related to a future position of a vehicle not received by the network interface, from the past data stored in the memory; and
      predict the future data by using the determined past data.

2. The information processing device according to claim 1, wherein the processing circuitry determines less past data to be used for predicting the future data as the delay time is smaller.

3. The information processing device according to claim 1, wherein:
   the memory stores, by associating, a delay time with at least one of a number, an amount, and a time range of the past data required for predicting the future data in the delay time; and
   the processing circuitry determines the past data based on at least one of the number, the amount, and the time range associated with the calculated delay time in the memory.

4. The information processing device according to claim 3, wherein the processing circuitry is further configured to update at least one of the number, the amount, and the time range associated with the calculated delay time in the memory, based on a comparison result between the future data predicted by the processing circuitry and data corresponding to the future data received by the network interface.

5. The information processing device according to claim 1, wherein:
   the information processing device is an information processing device on a cloud side; and
   the processing circuitry calculates the delay time, based on a transmission time of the data from an edge side including the device and a reception time of the data by the network interface.

6. The information processing device according to claim 5, wherein the processing circuitry is further configured to:

generate control information used for control of the edge side, based on the future data; and transmit the generated control information to an information processing device on the edge side.

7. The information processing device according to claim 1, wherein:

the information processing device is an information processing device on an edge side including the device;

the network interface receives information regarding the transmission time from a cloud side; and the processing circuitry calculates the delay time, based on the transmission time and the reception time of the information from the cloud side by the network interface.

8. The information processing device according to claim 7, wherein the processing circuitry is further configured to:

transmit the future data predicted by the processing circuitry to an information processing device on the cloud side; and perform control on the edge side, based on control information generated in an information processing device on the cloud side based on the future data.

9. An information processing method that uses an information processing device that performs communication via a network, the information processing method comprising:

a step of receiving data related to a position of a vehicle acquired by a device;

a step of storing the data in a memory provided in the information processing device;

a step of calculating a delay time in the network by comparing a transmission time and a reception time of the data received;

a step of determining, based on the calculated delay time, one or more pieces of past data related to a past position of a vehicle to be used for predicting future data related to a future position of a vehicle that has not yet been received, from past data received prior to the data stored in the memory; and a step of predicting the future data by using the determined past data.

10. A non-transitory storage medium that stores an information processing program that causes an information processing device that performs communication via a network to execute the following process, the following process comprising:

a step of receiving data related to a position of a vehicle acquired by a device;

a step of storing the data in a memory provided in the information processing device;

a step of calculating a delay time in the network by comparing a transmission time and a reception time of the data received;

a step of determining, based on the calculated delay time, one or more pieces of past data related to a past position of a vehicle to be used for predicting future data related to a future position of a vehicle that has not yet been received, from past data received prior to the data stored in the memory; and a step of predicting the future data by using the determined past data.

* * * * *